Oct. 17, 1933.   C. I. HALL   1,931,145
HEATING SYSTEM
Filed Aug. 18, 1930
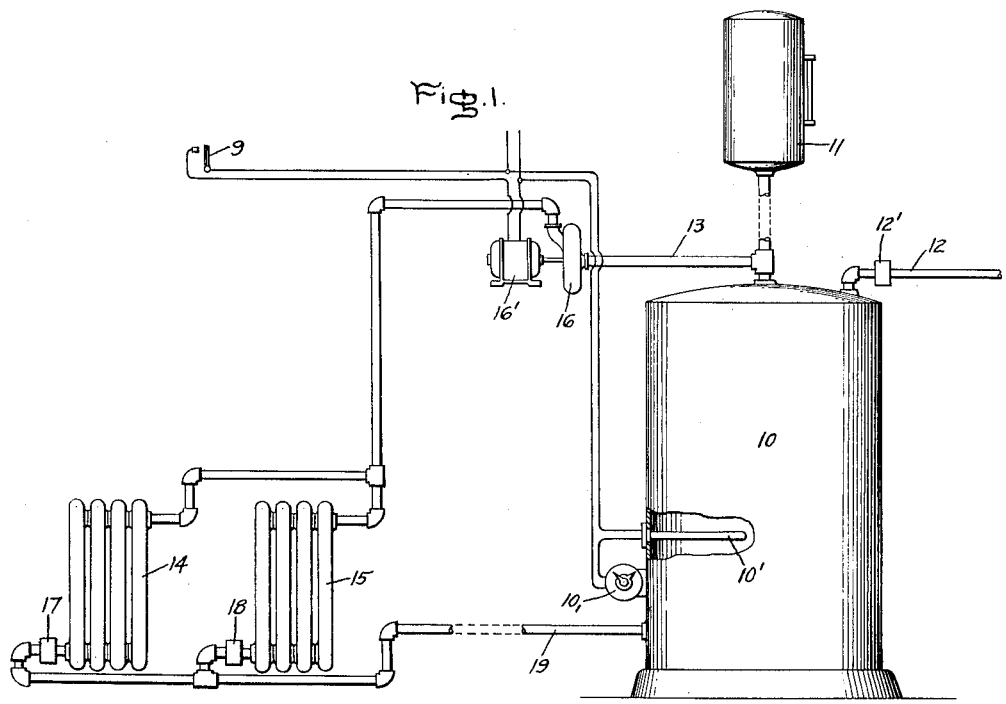
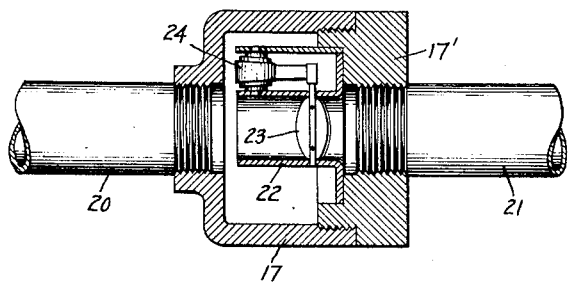
Inventor:
Chester I. Hall,
by Charles E. Tullar
His Attorney.

Patented Oct. 17, 1933

1,931,145

UNITED STATES PATENT OFFICE 1,931,145

HEATING SYSTEM

Chester I. Hall, Philadelphia, Pa., assignor, by mesne assignments, to General Electric Company, a corporation of New York Application August 18, 1930. Serial No. 475,974

14 Claims. (Cl. 219—38)

My invention relates to a heating system, and provides an improved type of heating system in which a heating medium stored at high temperatures is supplied to the heat radiators only when the temperature thereof in the radiators decreases below a minimum value.

In present hot water house and building heating systems, ordinarily of the combustion type, the heating furnace or boiler is usually placed at some distance from that part of the premises which is to be heated and connected thereto by means of long pipes. When such a system is in operation, the hot water which is at a very high temperature continuously circulates by gravity (thermal) circulation throughout the system. This necessarily results in considerable loss of heat in the pipes connecting the radiating means with the heat generating means. Moreover all of the useful heat carried by the hot water is not extracted therefrom at the position where it is desired to furnish the heat but some is returned to the heating furnace or boiler. In heating systems depending upon the thermal action of the heating medium the circulation is slow and is not always satisfactory. Thus, portions of the heating system which are at some distance from the heat generating apparatus may be provided with a heating medium which has lost a great deal of its useful heat on its way to that portion of the system due to the length of time that it takes for the heating medium to reach the system to be heated. In a hot water system, particularly if the fires are permitted to fluctuate, the water cools off in the system intermittently—a very undesirable feature. The fires are not as a rule kept at any uniform rate of combustion and therefore more or less heat is furnished depending entirely upon the condition of the fires. This, of course, affects the temperature of the hot water, so hot water at varying temperatures is furnished to the radiating means thus resulting in an uneven temperature being maintained by the heating system. From the above it can be seen that if the fires get too hot the water is circulated continuously throughout the system at excessive temperatures which is wasteful and uneconomical.

It is the principal object of my invention to obtain the maximum amount of useful heat from the heating medium supplied to the heat radiators before the heating medium is returned to the heat generating means to be reheated.

It is another object of my invention to provide a heating system in which the heating medium may be circulated in a positive and controlled manner.

It is a further object of my invention to provide a heating apparatus which will store a supply of heating medium during periods of low power demand.

These and other objects will appear hereinafter.

In the preferred embodiment of my invention I provide an electric heater and storage tank for supplying hot water at a high temperature. The temperature of the water in the storage tank may be automatically controlled by means of a thermostat control. Radiators are connected to the heater and to speed up the charging of the radiators a pump is provided for pumping or circulating charges of the hot water from the heating tank to the radiators although the system is capable of operation without the pump thermal circulation being obtained by placing the radiators above the heater. A thermostatically controlled valve placed in the outlet of the radiators controls the delivery of the charges of hot water to the radiators from the heater means. This thermostatically controlled valve operates so that when the hot water in the radiators has cooled to a predetermined temperature, the valve will open to permit the pump to supply a new charge of hot water to the radiators. If no pump is used the thermal circulation will recharge the radiator where there is no pump. A valve manually or electrically controlled can be used to shut off the pipe from the heater to the radiators between charges. When the radiators have been recharged with the hot water, the hot water at high temperature contacting with the thermostatically controlled radiator outlet valves causes them to close to prevent further circulation of hot water or other heating medium to the heating system. The heater and control apparatus may be installed as a unit.

My invention will be better understood from the following description when considered in connection with the accompanying drawing, and its scope will be pointed out in the appended claims.

In the accompanying drawing, Fig. 1 illustrates a preferred embodiment of my invention; Fig. 2 is a schematic cross section of a detail thereof.

Referring now to Fig. 1, the heat generating means 10 consists of a water storage tank which is heated by the electric heater 10' preferably of the immersion type. The temperature of the water therein may be automatically regulated by any thermostatic control (not shown) to provide hot water at a uniform temperature.

It is well known that electric power is not much in demand during certain periods of the night and day, known as "off peak" periods, and power companies in order to smooth out the demands offer lower rates for the use of power during these low-demand periods. With my device I am able to use power during these periods to heat the heating medium and store this medium for periods when heat is in demand. I provide an automatic timing device 10₁, of any well known type, for switching the power on during the periods of low demand to heat the water thus effecting material savings in the cost of energy.

Mounted above and connected to the heater 10 is the expansion tank 11 the function of which is to take care of expansion of the heated water. An outside outlet 12 is provided with a safety valve 12'. The radiators 14 and 15 are connected to the hot water supply by means of the pipe 13. There may, of course, be one or a plurality of radiators depending upon the size of the heating apparatus necessary. A pump 16 is provided in the connecting pipe 13 between the radiators and the heater for circulating the hot water through the system. The pump 16 is driven by an electric motor 16' controlled by a room thermostat 9 which is placed near the radiators. The pump could also be installed in pipe 19. Obviously the motor could be hand controlled. Connected to the outlet sides of the radiators 14 and 15 are the valves 17 and 18 which thermostatically control the delivery of charges of hot water from the heat storage tank 10 by means of the pump 16. 19 is a return pipe for the cooled water from which the heat has been extracted in the radiators 14 and 15. The whole system may be installed as a single unit at any point where it is desired to furnish heat.

In Fig. 2 is shown a cross section of a diagrammatic form of the thermostatically controlled valve. This valve may be applied directly to the outlet side of the radiator or may be applied between the outlet and the return pipe to the heater. A flange 17' supports a unit consisting of an orifice 22 which is closed by means of butterfly valve 23 which is pivotally supported by means of the orifice. Supported adjacent to the butterfly valve and connected thereto for the purpose of rotating the valve about its pivot to open and close the same is a thermostatic coil 24. This coil 24 responds to the temperature of the water to open and close the butterfly valve 23. When the temperature of the water is below a predetermined degree, the thermostatic coil 24 opens the valve 23 to permit the cooled water or other heating medium to be expelled from the heat radiating apparatus. The valve closes when the thermostatic coil responds to water at high temperatures coming into contact therewith. The cooled water leaves the radiating means by means of the pipe 20 and passes from the valve by means of pipe 21.

In operation, the heater 10 furnishes water or other heating medium at a high temperature to the radiators 14 and 15. Pump 16 circulates the water through the system. Assuming the water in the radiators to be initially cold and the heat generating system to have been put into operation, the valves will open to permit the pump to charge the radiators 14 and 15 with a supply of hot water at very high temperatures, for example, about 250° F., when the thermostat 9, due to the falling room temperature, responds to energize the motor. The pump is used to hasten the charging process although without the pump thermal circulation would cause recharging. When this water passes through the radiators and comes into contact with the thermostatic coil 24, the coil rotates the valve 23 about its pivot to close the valve which prevents any further circulation of the hot water through the system. The room thermostat then opens in response to the rise in room temperature to stop the motor. When the thermostat is properly placed very little lag takes place between the action of the valves and the pump. The charge of hot water which is in the radiators then gives up its heat to the surrounding atmosphere. When the hot water has cooled to a predetermined temperature, for example, about 150° F. the valve again opens. The room thermostat 9 again responds and the pump then furnishes a new charge of water to the radiators by expelling the water which has been cooled and filling the radiators with the new charge of hot water. When this charge of hot water comes into contact with the valves, the valves again close to keep the new charge of hot water in the radiators until the surrounding atmosphere has absorbed all of the useful heat from the heating medium. Of course, it will be understood that the rate of charging depends upon the temperature and for colder temperatures, more frequent charges will result than for higher temperatures. In this manner, the various temperatures encountered by the heating system are automatically taken care of.

It will thus be seen that my system produces circulation of water at very high temperatures throughout the system only during charging of the radiators thus preventing waste of heat. The maximum amount of useful heat is absorbed by the atmosphere to be heated before the water is expelled from the radiators and a new charge of hot water is supplied to the radiating means from the heater. The heater and control apparatus may be installed as a unit easily and conveniently at whatever point desired. Circulation of charges of the hot water supplied from the heater always occurs at a high temperature.

The embodiment of the invention illustrated and described herein has been selected for the purpose of clearly setting forth the principles involved. It will be apparent, however, that the invention is susceptible of being modified to meet the different conditions encountered in its use, and I therefore, aim to cover by the appended claims all the modifications within the true spirit and scope of my invention.

What I claim as new and desire to secure by Letters Patent of the United States, is:

1. A heating system comprising a circulating system for a heating medium including means for heating the medium, means for storing the heating medium, and means for transferring the heat from the medium for heating purposes, a thermostatically controlled pump operable in response to predetermined temperature conditions for circulating the medium in said system, and independently operable means responsive to the temperature of the medium in said heat transfer means for stopping the circulation of the medium therethrough when the temperature of the medium therein exceeds a predetermined value.

2. A heating system comprising a heat-generating and storage means for a heating medium, a heat-radiating means having an inlet and an outlet, means for delivering the heated medium from said heat-generating means to the inlet of said radiating means, means responsive to predetermined temperatures for controlling said delivery means, and thermostatically controlled means responsive to the temperature of the medium at the outlet of said heat-radiating means for stopping the delivery of heated medium to said heat-radiating means when the temperature of the medium at the outlet of said radiating means increases to a predetermined value.

3. A heater comprising a heat-generating and storage means for a heating medium, a heat-radiating means having an inlet and an outlet, a pump for delivering heated medium from said generating means to the inlet of said radiating means, a thermostat responsive to predetermined temperatures for controlling operation of said pump, and a thermostatically controlled valve responsive to the temperature at the outlet of said radiating means for stopping the delivery of heated medium to said heat-radiating means when the temperature of the medium at the outlet of said radiating means increases to a predetermined value.

4. A heating system having a hot water storage tank, means for heating the water in said tank, a radiator having an inlet and a separate outlet, a pump for delivering hot water from said tank to the inlet of said radiator, a thermostat for controlling said pump, a separate conduit for returning the liquid from the outlet of said radiator to the tank, a thermostatically controlled valve responsive to the temperature of the water at the outlet of said radiator and closed when the radiator is charged with hot water at a high temperature for preventing circulation of water through said radiator by said pump, and automatically opening when the temperature of the water in said radiator decreases to a predetermined temperature, whereby said pump may charge the radiator with hot water and return the water in the radiator at the predetermined temperature to the hot water storage tank.

5. A hot water heating system comprising a heat generating means, a heat radiating means having an inlet and an outlet, connections between said heat generating means and the inlet and outlet of said heat radiating means for providing a passage for the hot water, a pump for delivering hot water to the inlet of said radiating means, means responsive to predetermined temperatures for controlling said pump, and a thermostatic valve responsive to the temperature of the water in said outlet, closed when said radiating means is charged with water at a relatively high temperature and automatically opened when the temperature of the water at the outlet decreases to a predetermined value whereby said pump may deliver a new charge of water at a relatively high temperature.

6. A hot water heating system comprising an electric heater and storage tank for storing water at high temperatures, radiators connected thereto having inlets and outlets, a pump for delivering hot water from the heater to the inlets of said radiators, means responsive to predetermined temperatures for controlling said pump, a thermostatically controlled valve in the outlet of each of said radiators, said valve being closed when the temperature of the hot water in said radiator is above a predetermined temperature and operating in response to the cooling of the hot water in said radiator to a predetermined temperature whereby said pump can deliver hot water to said radiating means from said heater in charges.

7. A heating system having a hot water storage tank, means for heating the water in said tank, a plurality of radiators provided with inlets and separate outlets, conduits for connecting said inlets and outlets to said storage tank, means for forcing hot water from said tank to the inlets of said radiators, means responsive to predetermined temperatures for controlling said forcing means, a separate thermostatically controlled valve associated with each radiator and individually responsive to operate to the closed position when the radiator is charged with hot water and automatically operating to open when the temperature of the water at the outlet of the radiator decreases to a predetermined value.

8. A water heating system comprising a heater and storage tank, radiators provided with inlet and outlet openings for receiving hot water from said storage tank, a pump for delivering hot water from said tank to said radiators, a thermostat for controlling said pump, thermostatically controlled valves in said outlets which are closed when said radiators are charged with hot water to stop circulation of hot water therethrough and which open when the temperature of the hot water in the radiators cools to a predetermined value, whereby said radiators are recharged with hot water from said storage tank by said pump.

9. An electric water heating system comprising an electric heater, radiators provided with an inlet and an outlet, connections between said heater and radiators at said inlet, a thermostatically controlled pump in said connections for delivering hot water to said radiators, a thermostatically controlled valve in the outlet of each radiator for controlling the delivery of charges of hot water to the radiators, connections between said valves and said heater, said valve being closed when the temperature of the hot water in said radiators is above a predetermined temperature and responsive to the cooling of the water in said radiators below said predetermined temperature to open, whereby said pump can deliver a new charge of hot water from said heater to said radiators, and the old charge can be returned to said heater.

10. An electric heating apparatus comprising an electric heater and storage tank for hot water, automatically controlled heating means adapted to be energized during periods of low power demand for heating said water, heat radiating means provided with an inlet and an outlet and connected to said storage tank, a thermostatically controlled pump for delivering hot water from said storage tank to the radiating means, a thermostatically controlled valve in the outlet of each of said radiating means, closed in the presence of water at high temperatures and operating in response to the cooling of the hot water in said radiating means to predetermined temperature whereby said pump can deliver a charge of hot water to said radiating means.

11. A heating system having a hot water storage tank, means for heating the water in said tank, radiators having inlets and outlets, conduits for connecting said inlets and outlets to said tank, a pump for delivering hot water from said tank to the inlets of said radiators, a thermostat for controlling said pump, a thermostatically controlled valve in the return conduit of each radiator for separately and independently controlling the outlet of the radiator, said valve being closed when the radiator is charged with hot water at a high temperature, thereby preventing circulation of hot water through said radiator and automatically opening when the temperature of the hot water within the radiator decreases to a predetermined value, whereby said pump may deliver hot water from said tank to said radiator, said valve automatically closing when said radiator has been recharged with hot water.

12. An electric hot water heating system comprising an electric heater and storage tank, radiators having inlet and outlet connections between said heater and radiators, a pump thermostatically controlled in said connections for delivering hot water from the heater to the radiators, thermostatic valves connected in the outlet of said radiators and closed in the presence of hot water in said radiators to prevent circulation of hot water in said system, but opening in response to the cooling of the water in the radiators to a predetermined temperature whereby said pump can recharge said radiators with water at high temperature.

13. In a heating system, a liquid storage tank having means for heating the liquid therein to a relatively high temperature, a radiator, means for delivering the high temperature liquid from the tank to the radiator, a separate conduit for returning the liquid from the radiator to the tank, and thermostatically controlled means for automatically closing said return conduit when the radiator is charged with a high temperature liquid and for automatically opening said return conduit when the temperature of the liquid charge decreases to a predetermined value.

14. A heating system having a hot water storage tank, means for heating the water in said tank to a relatively high temperature, a radiator having an inlet and a separate outlet, means for delivering hot water from said tank to the inlet of said radiator means for returning the water from the outlet of the radiator to said tank and a thermostatically controlled valve in said outlet for automatically closing said return means when the radiator is charged with hot water at high temperature and for automatically opening said return means when the temperature of the charge of hot water within the radiator decreases to a predetermined value.

CHESTER I. HALL.